United States Patent [19]

Stadler et al.

[11] 4,343,373
[45] Aug. 10, 1982

[54] ELECTRONIC WEIGHING APPARATUS WITH CALIBRATING DEVICE

[75] Inventors: Eberhard Stadler; Dieter Blawert, both of Göttingen, Fed. Rep. of Germany

[73] Assignee: Sartorius GmbH, Fed. Rep. of Germany

[21] Appl. No.: 247,219

[22] Filed: Mar. 24, 1981

[30] Foreign Application Priority Data

Mar. 29, 1980 [DE] Fed. Rep. of Germany ....... 3012344

[51] Int. Cl.³ .................. G01G 19/52; G01G 7/00; G01G 23/01
[52] U.S. Cl. .................. 177/50; 177/212; 73/1 B
[58] Field of Search .................. 177/50, 210 EM, 212; 73/1 B

[56] References Cited

U.S. PATENT DOCUMENTS

Re. 27,263 12/1971 Garnett .................. 177/50 X
3,656,337 4/1972 McDonald .................. 177/50 X
4,156,361 5/1979 Melcher et al. ......... 177/210 EM X Primary Examiner—George H. Miller, Jr.
Attorney, Agent, or Firm—Eric P. Schellin

[57] ABSTRACT

An electronic weighing apparatus having a load pan, a load receiver forming part of a parallel construction and supporting the pan, weight compensating means, and at least one force-transmitting lever having a short arm and a longer arm, connected at its short arm to take up the force transmitted by the load pan, and connected at its longer arm with the weight compensating means, wherein a built-in calibrating device includes a calibrating lever having an arm connected via a coupling element in force transmitting relation with the load receiver such that the force-transmitting connection can be selectively established or broken.

8 Claims, 5 Drawing Figures

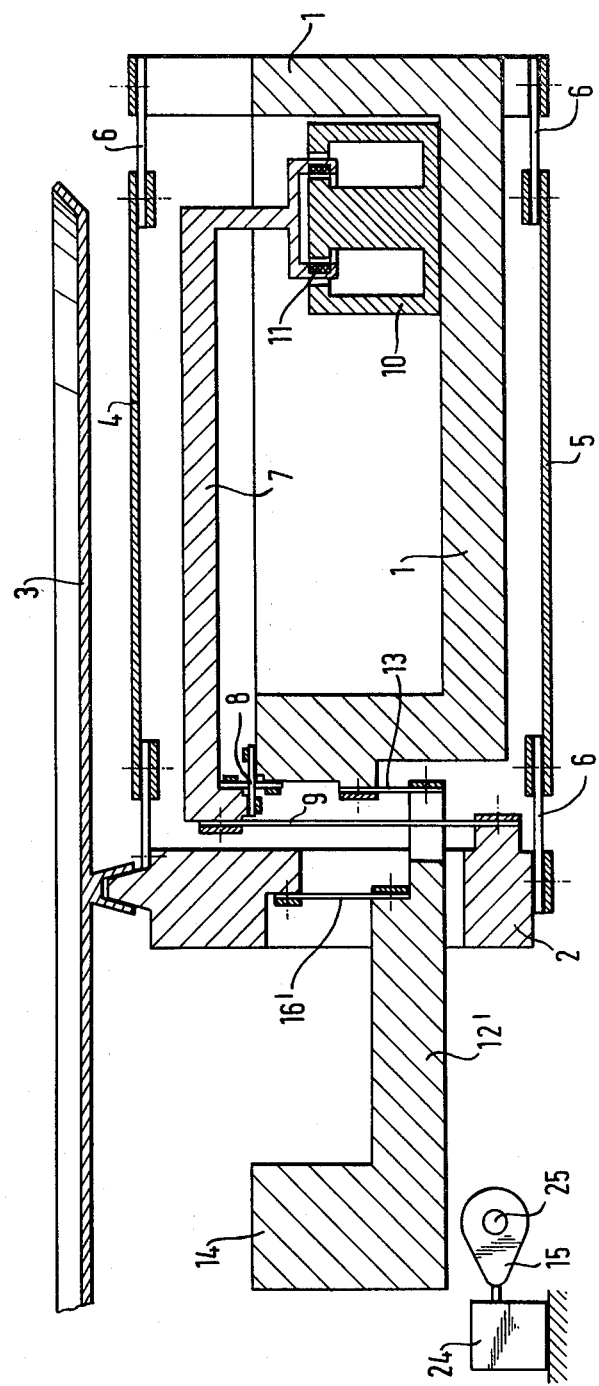

ELECTRONIC WEIGHING APPARATUS WITH CALIBRATING DEVICE

BACKGROUND OF THE INVENTION

1. Field of the Invention

The invention relates to an electronic weighing apparatus with a load pan, a load receiver which is part of a parallel construction and supports the pan, and at least one two-armed force-transmitting lever with a shorter arm which takes up the force transmitted by the load pan, and a longer arm for the balancing force, and finally with a built-in calibrating device.

2. Prior Art

In order to permit regular sensitivity testing in electronic weighers, which e.g. seems indicated in weighers with a high reduction ratio and in gauged weighers, installation of a calibrating device is suitable. Calibrating is thereby simplified and errors caused by a possibly improper storage of an external calibration weight piece are avoided.

To this end, it has been suggested (DE-GM 7607012) to lengthen the shorter arm of the two-armed force-transmitting lever and to provide thereon a support for a calibration weight piece that can be lowered. This suggested structure, however, entails the disadvantage that the shorter arm of the two-armed force-transmitting lever must be lengthened approximately to the length of the longer arm of this lever, in order to obtain for the calibration weight piece the same force-transmitting factor as for the system for the generation of the balancing force. This requires more space and significantly increases the inertia moment of the two-armed force-transmitting lever, whereby the building-up time of the weigher becomes longer. It is also conceivable to modify this structure in such a way that the calibration weight piece is arranged on the longer arm of the two-armed force-transmitting lever. However, due to the force direction reversal of the two-armed lever, this produces the result that the calibration weight piece must in normal operation rest against its support and be lifted only for calibration. This again increases the moment of inertia of the two-armed force-transmitting lever during the normal weighing operation, so that in this case, too, a longer building-up time results. Moreover, the increased lever mass leads to greater problems in the transportation safety of the weighing apparatus.

Furthermore, it is known from U.S. Pat. No. 4,156,361 to provide in an electronic weigher with parallel construction a calibration weight piece below the weighing pan and to lower it to a hanger attachment for calibration. This arrangement, is very well suited to small maximum loads, but for weighing ranges from some kilogram maximum load upward, which loads are customary for weighers with force-transmitting levers, it leads to very heavy calibration weight pieces, which makes the weigher correspondingly heavy, bulky, and expensive.

SUMMARY OF THE INVENTION

The principal object of the invention is, therefore, the elimination of the disadvantages described of the known calibrating devices in electronic weighers.

To accomplish this objective, the invention comprises an electronic weighing apparatus with a load pan, a load receiver which is part of a parallel construction and supports the pan, and at least one two-armed force-transmitting lever which has a shorter arm that takes up the force transmitted by the load pan, and a longer arm for the balancing force, and finally with a built-in calibrating device. In such a weighing apparatus, the calibrating device consists, in a first modification, of a two-armed calibrating lever whose center of gravity is located on one side of the lever, while on the other side a force-transmitting connection to the longer lever arm of the force-transmitting lever can be selectively established or broken via a force-transmitting element.

The short arm of this lever for the calibrating device need not be changed by the force transmitting to the longer arm of the force-transmitting lever. Likewise, the full transmission factor of the force-transmission lever can be utilized, so that the mass of the calibrating lever remains small. When the two lever arms of the calibrating lever are made of different lengths, the mass of the calibrating lever can, when necessary, be further decreased. The construction as a two-armed calibrating levers results in a force direction reversal, so that, regardless of the coupling to the longer arm of the force-transmitting lever, the calibrating lever is, during normal weighing operation, not in force-transmitting connection to the weighing system, so that the building-up behavior thereof is not impaired.

In a second modification, the calibrating device consists of a one-armed calibrating lever, which a force-transmitting connection to the load receiver can be selectively established or broken via a coupling element.

This modification does not present such a large force transmission, so that it is particularly suitable for weighers with average maximum loads, i.e. 1–10 kg. In return for this, it offers the advantage that the force of the calibrating lever engages the load receiver directly. Due to this fact, the force conditions within the weighing system upon weighing and upon calibrating differ less than in the first modification, which proves to be advantageous in weighers with a high reduction ratio.

This difference of the force conditions within the weighing system upon weighing and upon calibrating is particularly small when the coupling element engages the load receiver centrally below the load pan.

The coupling element is constructed in a first advantageous embodiment as a strap. When the strap is taut, it presents a force-transmitting connection between the calibrating lever and the force-transmitting lever or the load receiver, respectively, while by a slight rotation of the calibrating lever the strap becomes slack and no longer transmits any forces between the calibrating and force-transmitting lever or load receiver, respectively. However, even a small remaining force effect of the slack strap does not cause any adverse effect as long as it is constant, since it is taken into account in the electronic neutralization of the weighing apparatus.

The coupling element is, in a second advantageous embodiment, ball-shaped on both sides and engages correspondingly shaped spherical caps at the calibrating lever and at the force-transmitting lever or load receiver, respectively. In this embodiment, the force is transmitted during calibration as a compressive force; whereas in normal weighing, by a slight rotation of the calibrating lever one of the balls is lifted from the corresponding spherical cap, and the transfer of force is interrupted.

The coupling element is provided in a third advantageous embodiment with points on both sides which engage small caps at the force-transmitting lever or load receiver, respectively. Here, the force is transmitted during calibration as a compressive force, whereas in normal weighing, by a slight rotation of the calibrating lever one of the points lifts off from the corresponding spherical cap, and the transfer of force is interrupted.

Further embodiments of the coupling element are produced by exchanging the ball and spherical cap or, respectively, points and small caps, with each other, whereby the mode of operation does not change.

The slight rotation of the calibrating lever for breaking the force-transmitting connection between calibrating and force-transmitting lever or load receiver, respectively, may take place by any lifting device which engages the counterweight side of a calibrating lever. Advantageously, however, a trip cam is employed for this purpose.

When the electronic weighing apparatus is provided with a temperature compensation circuit, it is advisable to provide at the trip cam a swith element which switches, together with the establishment or breaking of the force-transmitting connection between the calibrating lever and the force-transmitting lever or load receiver, respectively, the temperature compensation circuit between two positions in order to balance a temperature behavior of the calibrating lever.

BRIEF DESCRIPTION OF THE DRAWINGS

The invention is described in the following, with the aid of the drawings, wherein:

FIG. 5 is a view similar to FIG. 1 of a still further modification, wherein an electronic weighing apparatus with a one-armed calibrating lever and a strap coupling is in the calibrating position.

DETAILED DESCRIPTION OF THE PREFERRED EMBODIMENTS

Figure 1:
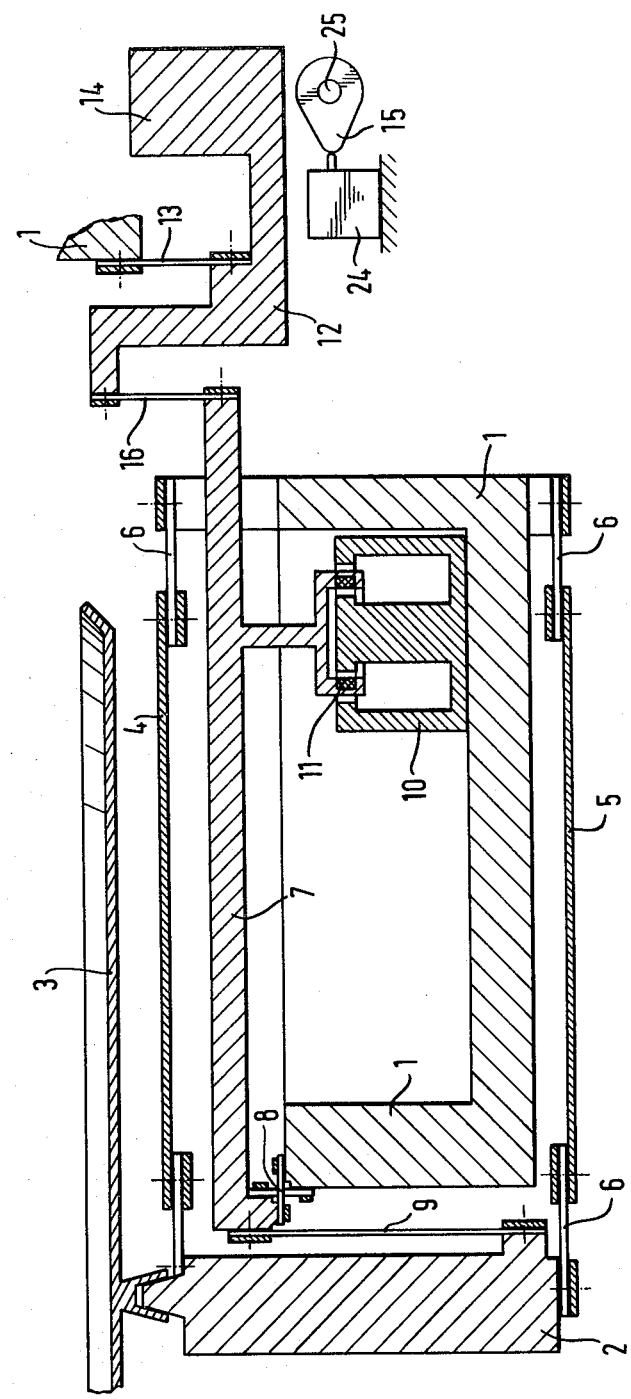
FIG. 1 is a diagrammatical sectional view of an electronic weighing apparatus according to the invention, with a two-armed calibrating lever and a strap coupling in the calibrating position.
Figure 2:
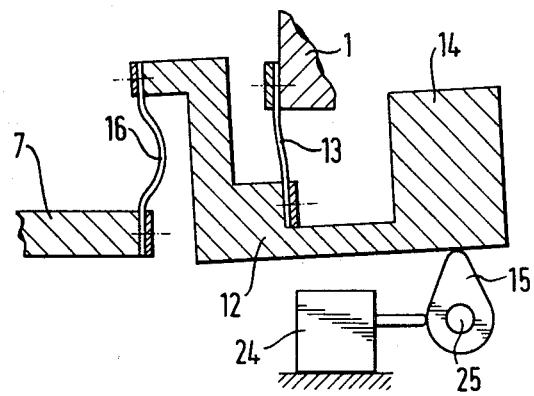
FIG. 2 is a fragmentary view of the calibrating lever and the strap of FIG. 1 in the weighing position

The electronic weighing apparatus in FIG. 1 consists of a fixed-casing support element 1 to which a load receiver 2 is movably fastened via two control levers 4 and 5 with moving joints 6. The load receiver 2 supports at its top part the load pan 3 and transmits the force transmitted by the load pan via a coupling strap 9 to the shorter arm of a force-transmitting lever 7. Force-transmitting lever 7 rests via a cross spring joint 8 on support element 1. A coil 11 carried by the longer arm cooperates with a permanent magnet 10 for generating an electromagnetic compensation force. The corresponding electronic devices are not shown since they are known and are immaterial for the invention. A calibrating lever 12 is hinged or coupled via a coupling element or strap 16 to the longer arm of the force-transmitting lever. This calibrating lever 12 is supported on a part of the fixed-casing support via a resilient joint 13. The center of gravity of calibrating lever 12 is located on the side of a counterweight 14 and ensures the result that in the calibrating position shown in the drawing, a defined upward directed force determined by the mass and the geometrical shape of the calibrating lever is transmitted via strap 16 to the longer arm of the force-transmitting lever. Thus, the calibrating lever acts like a load deposited on load pan 3. In normal weighing position, counterweight 14 is lifted by rotation of the trip cam 15 about its axis of rotation 25, and the calibrating lever is thereby somewhat rotated, so that strap 16 is relieved and buckles, as shown in FIG. 2. In this buckled state, strap 16 does no longer constitute a force-transmitting connection, so that, notwithstanding the fixed calibrating lever 12, force-transmitting lever 7 can freely move within the narrow range defined by the compensation device. Furthermore, a switch element 24 is provided at the trip cam 15, which switch element at the rotation of trip cam 15 is likewise actuated and switches into the electronic circuit a temperature compensation circuit or calls forth another temperature compensation program in a microprocessor (not shown). Thereby, a temperature behavior of the calibrating lever can be compensated in a known manner.

Calibrating lever 12, together with its force-transmission via strap 16, is shown in FIG. 1, for the sake of clearer presentation, outside the residual weighing system. Of course, the calibrating lever may also be rotated by 180°, so that the counterweight 14 is positioned between control levers 4 and 5. Likewise, the point of engagement for strap 16 can be selected in such a way as to be positioned on the force-transmitting lever 7 close to the force engagement point of the force compensation device 10 and 11, so that force-transmitting lever 7 need not, as shown in the drawing, be lengthened. The need for additional space indicated by the figures for the calibrating lever can therefore be largely avoided by corresponding construction.

Figure 3:
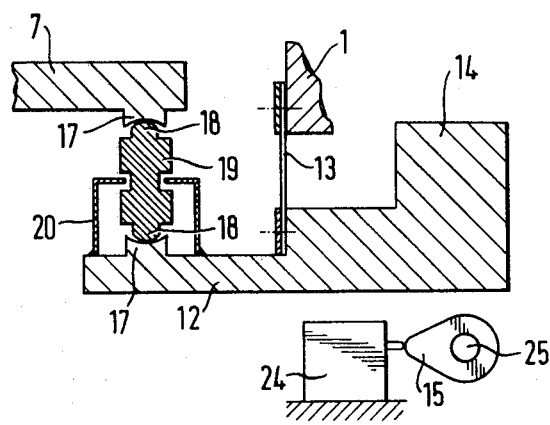
FIG. 3 is a view similar to FIG. 2 of a modification of the invention wherein the coupling of the calibrating lever is via balls and spherical caps.

FIG. 3 shows a second development of the coupling element. Here, calibrating lever 12, as well as force-transmitting lever 7, are each provided with a spherical cap 17. Between them, as in the calibrating position shown in the drawing, coupling element 19 with its ball-shaped ends 18 is fixed and transmits the force from calibrating lever 12 to force-transmitting lever 7. In the normal weighing position, counterweight 14 is again lifted via trip cam 15, so that coupling element 19 no longer touches with its top end the spherical cap 17 provided on force-transmitting lever 7 and is protected from tumbling only by a retaining clamp 20. In the transition to the calibrating position, coupling element 19 again positions itself in the same position in the deepest spot of spherical cap 17. Likewise, coupling element 19 may be shaped at its ends as a spherical cap and positions itself between ball-shaped elevations at force-transmitting lever 7 and calibrating lever 12.

Figure 4:
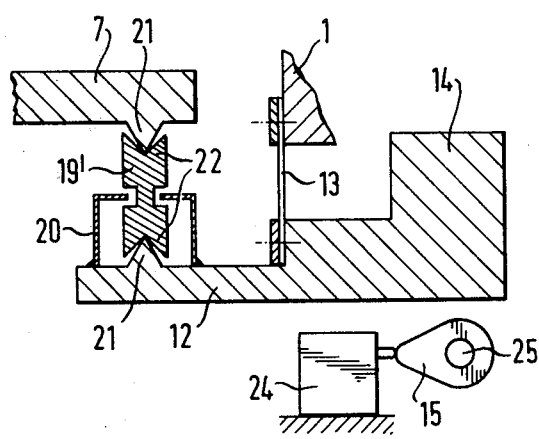
FIG. 4 is a view similar to FIG. 2 of a further modification of the invention wherein the coupling of the calibrating lever is via points and small caps.

FIG. 4 shows a third embodiment of the coupling element, similar to that shown in FIG. 3. Coupling element 19' is provided at its two ends with conical recesses 22, called small caps, which fix themselves in calibrating position between points 21 on calibrating lever 12 and force-transmitting lever 7. In weighing position, the top small cap no longer touches the point on force-transmitting lever 7, and coupling element 19' is protected from tumbling by retaining clamps 20. Here it is again possible to reverse the small caps and points without changing the operation.

In FIG. 5, a one-armed calibrating lever 12' is shown which is supported via a resilient joint 13 on the fixed-casing support element 1. Strap 16' and counterweight 14 are positioned at the same side of calibrating lever 12', so that in the calibrating position shown in the drawing, a vertically downward directed force is transmitted to load receiver 2 via strap 16' acting as a coupling element. Strap 16' is coupled to load receiver 2 centrally below load pan 3. Elements 1 to 11 of FIG. 5 are identical with the corresponding elements of FIG. 1; and the same applies to trip cam 15 and switch element 24.

In this modification, the force-transmitting factor is determined by the lever arm conditions on the one-armed lever 12', and is generally smaller than in the modification of FIG. 1. To make up for this, the calibrating force engages the load receiver 2 directly, so that the strap 9 and force-transmitting lever 7 are equally loaded under both weighing and calibrating conditions.

The embodiments of the coupling element as in FIGS. 3 and 4 are of course also possible for the one-armed calibrating lever of FIG. 5. Likewise, the statements made above concerning FIG. 1 about the space-saving mode of construction applies also to the arrangement of FIG. 5.

In distinction to the parallel construction of the load pan support by upper and lower control levers and the load receiver coupled therewith, shown in the drawings, the parallel construction of the load pan in known weighbridges, consists, e.g., of two levers which sum up the forces at eccentric loading, as shown in U.S. Pat. No. 3,835,946 and U.S. Ser. No. 772,058 (DE-OS 27 40 699). In the interaction with these bridge levers, the calibrating lever 12 or 12' according to the invention may also be employed.

What is claimed is:

1. An electronic weighing apparatus comprising:
 a load pan;
 a load receiver forming part of a parallel construction and supporting the pan;
 a weight compensating means;
 at least one two-armed force-transmitting lever having a short arm and a longer arm, and at its short arm connected to take up the force transmitted by the load pan, and at its longer arm connected with the weight compensating means; and
 a built-in calibrating device comprising a two-armed calibrating lever having a center of gravity located on one side of the lever, while on the other side of the lever a force-transmitting connection to the longer arm is provided via a coupling element whereby the force-transmitting connection can be selectively established or broken.

2. An electronic weighing apparatus, comprising:
 a load pan;
 a load receiver forming part of a parallel construction and supporting the load pan;
 a weight compensating means;
 at least one two-armed force-transmitting lever having a short arm and a longer arm, and at its short arm is connected to take up the force transmitted by the load pan, and at its longer arm is connected with the weight compensating means and a built-in calibrating device comprising a one-armed calibrating lever having an arm connected via a coupling element in force-transmitting connection to the load receiver, whereby the force-transmitting connection can be selectively established or broken.

3. An electronic weighing apparatus as in claim 2, wherein:
 the coupling element engages the load receiver centrally below the load pan.

4. An electronic weighing apparatus as in one of claims 1, 2 or 3, wherein:
 a strap comprises the coupling element.

5. An electronic weighing apparatus as in one of claims 1, 2 or 3, wherein:
 the coupling element is ball-shaped on both sides and engages correspondingly shaped spherical caps on the calibrating lever and on the force-transmitting lever, respectively.

6. An electronic weighing apparatus as in one of claims 1, 2 or 3, wherein:
 the coupling element is provided on both sides with small caps which are engaged against points on the calibrating lever and the force-transmitting lever, respectively.

7. An electronic weighing apparatus as in one claims 1, 2 or 3, wherein:
 a trip cam is disposed to selectively engage the calibrating lever, whereby the force-transmitting connection between the calibrating lever and one of the force-transmitting lever and load receiver, respectively, can be established or broken by means of the trip cam.

8. An electronic weighing apparatus as in claim 7, wherein:
 a temperature compensation circuit is provided;
 operable upon the establishment or breaking of the force-transmitting connection between the calibrating lever and one of the force-transmitting lever and the load receiver, respectively, to switch the temperature compensation circuit between two positions.

* * * * *